United States Patent
Kodama et al.

(10) Patent No.: US 10,740,138 B2
(45) Date of Patent: Aug. 11, 2020

(54) MIGRATION CONTROL APPARATUS AND MIGRATION CONTROL METHOD

(71) Applicant: FUJITSU LIMITED, Kawasaki-shi, Kanagawa (JP)

(72) Inventors: Hiroyoshi Kodama, Isehara (JP); Shigeto Suzuki, Kawasaki (JP); Hiroyuki Fukuda, Yokohama (JP); Kazumi Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 16/281,724

(22) Filed: Feb. 21, 2019

(65) Prior Publication Data
US 2019/0278626 A1    Sep. 12, 2019

(30) Foreign Application Priority Data
Mar. 6, 2018 (JP) .................. 2018-040137

(51) Int. Cl.
| G06F 9/455 | (2018.01) |
| G06F 9/48 | (2006.01) |
| G06F 9/50 | (2006.01) |

(52) U.S. Cl.
CPC ........ *G06F 9/45558* (2013.01); *G06F 9/4856* (2013.01); *G06F 9/5094* (2013.01); *G06F 2009/4557* (2013.01); *G06F 2009/45591* (2013.01)

(58) Field of Classification Search
None
See application file for complete search history.

(56) References Cited

FOREIGN PATENT DOCUMENTS

JP    2016-177651    10/2016

*Primary Examiner* — Gregory A Kessler
(74) *Attorney, Agent, or Firm* — Fujitsu Patent Center

(57) ABSTRACT

A migration control apparatus includes one or more processors configured to successively select, as a first group, a virtual machine in an ascending order of power consumption from among a first plurality of virtual machines, until total power consumption of one or more non-selected virtual machines in the first plurality of virtual machines falls below a threshold, successively select, as a second group, another virtual machine in a descending order of power consumption from among the first plurality of virtual machines, until total power consumption of one or more other non-selected virtual machines in the first plurality of virtual machines falls below the threshold, select a specific group in accordance with a first number of virtual machines included in the first group and a second number of virtual machines included in the second group, and perform migration for at least one virtual machine included in the specific group.

13 Claims, 15 Drawing Sheets

FIG. 1A

| RACK# | LOCATION | HOST SERIAL NUMBER | HOST POWER CONSUMPTION | HOST USAGE RATE | VM#1 POWER CONSUMPTION | VM#2 POWER CONSUMPTION | VM#3 POWER CONSUMPTION | MIGRATION TARGET VM |
|---|---|---|---|---|---|---|---|---|
| A-1 | U30 | 1234567890 | 349 | 100 | 150 | 20 | 79 | N/A |
| | U29 | 1234567789A | 346 | 99 | 100 | 100 | 46 | N/A |
| | U28 | 1234567891 | 323 | 89 | 120 | 40 | 63 | N/A |
| | U27 | 1234567790A | 278 | 70 | 100 | 20 | 58 | N/A |
| | U26 | 1234567892 | 349 | 100 | 100 | 40 | 109 | N/A |
| | U25 | 1234567791A | 183 | 30 | 50 | 10 | 23 | VM#2 |
| | U24 | 1234567893 | 159 | 20 | 20 | 20 | 19 | VM#3 |
| | U23 | 1234567792A | 219 | 45 | 60 | 20 | 39 | VM#2 |
| | U22 | 1234567894 | 171 | 25 | 30 | 30 | 11 | VM#3 |
| | U21 | 1234567793A | 195 | 35 | 40 | 20 | 35 | VM#2 |
| | U20 | 1234567895 | 178 | 28 | 50 | 10 | 18 | VM#2, VM#3 |
| | U19 | 1234567794A | 171 | 25 | 25 | 25 | 21 | VM#3 |
| | U18 | 1234567896 | 188 | 32 | 20 | 20 | 48 | VM#1, VM#2 |
| | U17 | 1234567795A | 349 | 100 | 100 | 100 | 49 | N/A |
| | U16 | 1234567897 | 230 | 50 | 70 | 50 | 10 | VM#2, VM#3 |
| | U15 | 1234567796A | 159 | 20 | 13 | 26 | 20 | VM#1, VM#2 |
| | U14 | 1234567898 | 136 | 10 | 10 | 10 | 16 | VM#1, VM#2 |

FIG. 1B

| RACK# | LOCATION | HOST SERIAL NUMBER | HOST POWER CONSUMPTION | HOST USAGE RATE | VM#1 POWER CONSUMPTION | VM#2 POWER CONSUMPTION | VM#3 POWER CONSUMPTION | MIGRATION TARGET VM |
|---|---|---|---|---|---|---|---|---|
| A-1 | U13 | 123456797A | 159 | 20 | | 20 | 19 | VM#3 |
| | U12 | 1234567899 | 254 | 60 | 50 | 50 | 54 | VM#1, VM#2 |
| | U11 | 123456798A | 230 | 50 | 60 | 60 | 10 | VM#3 |
| | U10 | 1234567900 | 183 | 30 | 30 | 30 | 23 | VM#1, VM#2 |
| | U9 | 123456799A | 183 | 30 | 20 | 26 | 37 | VM#1, VM#2 |
| | U8 | 1234567901 | 185 | 31 | 10 | 40 | 35 | VM#1, VM#3 |
| | U7 | 123456800A | 301 | 80 | 10 | 40 | 151 | N/A |
| | U6 | 1234567902 | 197 | 36 | 30 | 50 | 17 | VM#1, VM#2 |
| | U5 | 1234567801A | 207 | 40 | 30 | 30 | 47 | VM#1, VM#2 |
| | U4 | 1234567903 | 190 | 33 | 10 | 10 | 70 | VM#1, VM#2 |
| | U3 | 123456802A | 230 | 50 | 10 | 10 | 110 | VM#1, VM#2 |
| | U2 | 1234567904 | 349 | 100 | 10 | 20 | 219 | N/A |
| | U1 | 123456803A | 349 | 100 | 50 | 50 | 149 | N/A |

HOST RATED POWER   350W

TOTAL RACK POWER   7002 W
UPPER THRESHOLD   7000 W
LOWER THRESHOLD   6950 W
POWER SUPPLY   8000 W

POWER AFTER MIGRATION   6942 W
NUMBER OF VM   6

FIG. 2A

| RACK# | LOCATION | HOST SERIAL NUMBER | HOST POWER CONSUMPTION | HOST USAGE RATE | VM#1 POWER CONSUMPTION | VM#2 POWER CONSUMPTION | VM#3 POWER CONSUMPTION | MIGRATION TARGET MIGRATION VM |
|---|---|---|---|---|---|---|---|---|
| A-1 | U30 | 1234567890 | 349 | 100 | 150 | 20 | 79 | N/A |
| | U29 | 1234567789A | 346 | 99 | 100 | 100 | 46 | N/A |
| | U28 | 1234567891 | 323 | 89 | 120 | 40 | 63 | N/A |
| | U27 | 1234567790A | 278 | 70 | 100 | 20 | 58 | N/A |
| | U26 | 1234567892 | 349 | 100 | 100 | 40 | 109 | N/A |
| | U25 | 1234567791A | 183 | 30 | 50 | 10 | 23 | VM#2 |
| | U24 | 1234567893 | 159 | 20 | 20 | 20 | 19 | VM#3 |
| | U23 | 1234567792A | 219 | 45 | 60 | 20 | 39 | VM#2 |
| | U22 | 1234567894 | 171 | 25 | 30 | 30 | 11 | VM#3 |
| | U21 | 1234567793A | 195 | 35 | 40 | 20 | 35 | VM#2 |
| | U20 | 1234567895 | 178 | 28 | 50 | 10 | 18 | VM#2, VM#3 |
| | U19 | 1234567794A | 171 | 25 | 25 | 25 | 21 | VM#3 |
| | U18 | 1234567896 | 188 | 32 | 20 | 20 | 48 | VM#1, VM#2 |
| | U17 | 1234567795A | 349 | 100 | 100 | 100 | 49 | N/A |
| | U16 | 1234567897 | 230 | 50 | 70 | 50 | 10 | VM#2, VM#3 |
| | U15 | 1234567796A | 159 | 20 | 26 | 26 | 7 | VM#1, VM#2 |
| | U14 | 1234567898 | 136 | 10 | 10 | 10 | 16 | VM#1, VM#2 |

FIG. 2B

| RACK# | LOCATION | HOST SERIAL NUMBER | HOST POWER CONSUMPTION | HOST USAGE RATE | VM#1 POWER CONSUMPTION | VM#2 POWER CONSUMPTION | VM#3 POWER CONSUMPTION | MIGRATION TARGET MIGRATION VM |
|---|---|---|---|---|---|---|---|---|
| A-1 | U13 | 123456797A | 159 | 20 | 20 | 20 | 19 | VM#3 |
| | U12 | 1234567899 | 254 | 60 | 50 | 50 | 54 | VM#1, VM#2 |
| | U11 | 123456798A | 230 | 50 | 60 | 60 | 10 | VM#3 |
| | U10 | 1234567900 | 183 | 30 | 30 | 30 | 23 | VM#1, VM#2 |
| | U9 | 123456799A | 183 | 30 | 20 | 26 | 37 | VM#1, VM#2 |
| | U8 | 1234567901 | 185 | 31 | 10 | 40 | 35 | VM#1, VM#3 |
| | U7 | 123456800A | 301 | 80 | 10 | 40 | 151 | N/A |
| | U6 | 1234567902 | 197 | 36 | 30 | 50 | 17 | VM#1, VM#2 |
| | U5 | 123456801A | 207 | 40 | 30 | 30 | 47 | VM#1, VM#2 |
| | U4 | 1234567903 | 190 | 33 | 10 | 10 | 70 | VM#1, VM#2 |
| | U3 | 123456802A | 230 | 50 | 10 | 10 | 110 | VM#1, VM#2 |
| | U2 | 1234567904 | 349 | 100 | 10 | 20 | 219 | N/A |
| | U1 | 123456803A | 349 | 100 | 50 | 50 | 149 | N/A |

HOST RATED POWER  350W

TOTAL RACK POWER  7002 W  
UPPER THRESHOLD  7000 W  
LOWER THRESHOLD  6950 W  
FEED POWER  8000 W

POWER AFTER MIGRATION  6902 W  
NUMBER OF VM  2

FIG. 4

| HOST NAME | RACK # | LOCATION IN RACK | DEVICE NAME | SERIAL # | TIME | HCP (W) | VMCP #1 | VMCP #2 | ... | VMCP #n |
|---|---|---|---|---|---|---|---|---|---|---|
| ServerA-1-1-U42 | A-1-1 | U42 | RX200S8 | MANS010547 | 2015.9.13 20:12.49 | 244 | 100 | 50 | | 30 |
| ServerA-1-1-U41 | A-1-1 | U41 | RX200S8 | AHFP178494 | 2015.9.13 20:12.50 | 248 | 110 | 20 | | 40 |
| ServerA-1-1-U40 | A-1-1 | U40 | RX200S8 | KHTY367834 | 2015.9.13 20:12.51 | 252 | 100 | 10 | | 30 |
| ServerA-1-1-U39 | A-1-1 | U39 | RX200S8 | PODF543965 | 2015.9.13 20:12.52 | 243 | 120 | 20 | | 10 |
| ... | | | | | | | | | | |

FIG. 5

| HOST NAME | RACK # | LOCATION IN RACK | DEVICE NAME | SERIAL # | TIME | HCP (W) | VMCP #1 | VMCP #2 | ... | VMCP #n | RACK POWER (W) |
|---|---|---|---|---|---|---|---|---|---|---|---|
| ServerA-1-1-U42 | A-1-1 | U42 | RX200S8 | MANS010547 | 2015.9.13 20:12.49 | 244 | 100 | 50 | | 30 | 5960 |
| ServerA-1-1-U41 | A-1-1 | U41 | RX200S8 | AHFP178494 | 2015.9.13 20:12.50 | 248 | 110 | 20 | | 40 | |
| ServerA-1-1-U40 | A-1-1 | U40 | RX200S8 | KHTY367834 | 2015.9.13 20:12.51 | 252 | 100 | 10 | | 30 | |
| ServerA-1-1-U39 | A-1-1 | U39 | RX200S8 | PODF543965 | 2015.9.13 20:12.52 | 243 | 120 | 20 | | 10 | |
| ... | | | | | | | | | | | |
| ServerA-1-2-U42 | A-1-2 | U42 | RX2530M1 | TYGH321869 | 2015.9.13 20:13.29 | 230 | 130 | 20 | | 20 | 6000 |
| ServerA-1-2-U41 | A-1-2 | U41 | RX2530M1 | BDSX189329 | 2015.9.13 20:13.30 | 244 | 150 | 10 | | 5 | |
| ServerA-1-2-U40 | A-1-2 | U40 | RX2530M1 | POIX219834 | 2015.9.13 20:13.31 | 238 | 110 | 30 | | 10 | |
| ServerA-1-2-U39 | A-1-2 | U39 | RX2530M1 | TXZP097111 | 2015.9.13 20:13.32 | 224 | 120 | 30 | | 30 | |

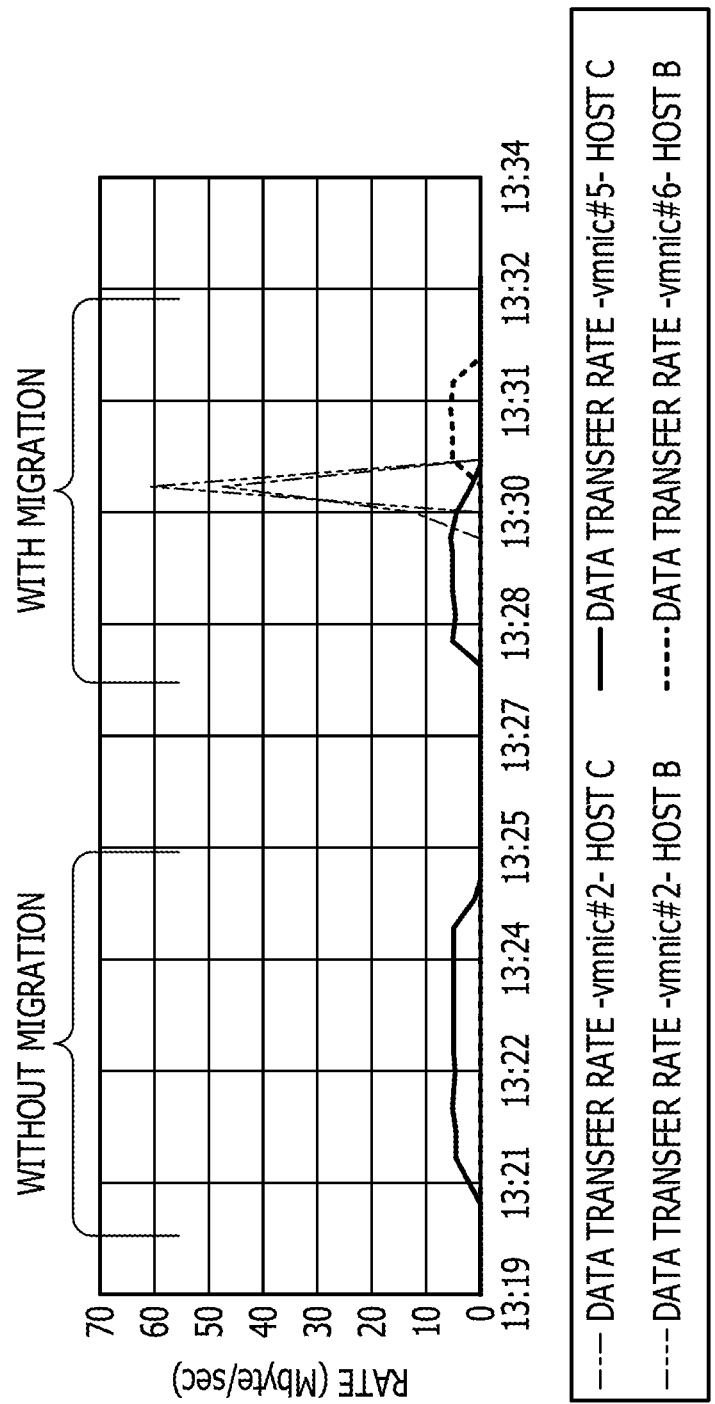

MIGRATION CONTROL APPARATUS AND MIGRATION CONTROL METHOD

CROSS-REFERENCE TO RELATED APPLICATION

This application is based upon and claims the benefit of priority of the prior Japanese Patent Application No. 2018-40137, filed on Mar. 6, 2018, the entire contents of which are incorporated herein by reference.

FIELD

The embodiment discussed herein is related to a migration control technology.

BACKGROUND

There is usually an upper limit for electric power that is supplied to, for example, a server rack accommodating multiple physical servers, and when electric power exceeds the upper limit, a circuit breaker cuts the power. Hence, when the power consumption of physical servers increases, it is desired to reduce the power consumption of the physical servers so as not to exceed the upper limit.

Reducing the load of a physical server is effective for reducing the power consumption of the physical server. FIG. 10 is a graph illustrating a relationship between physical server load and power consumption. As illustrated in FIG. 10, the power consumption of a physical server increases approximately in proportion to the load. Thus, if a virtual machine (VM) running on a physical server under a high-load condition is migrated to another physical server, it is possible to reduce the power consumption of the high-load physical server.

In the related art, there is a technique in which, in response to a request to limit the amount of electric power to be consumed in a power consuming system in a specific period, with respect to a virtual machine running on a server included in the power consuming system, a request for reporting the usage plan of the virtual machine in a specific future time period is sent to the user of the virtual machine. With this related art, it is possible to take measures based on the obtained usage condition of the server in the specific future time period, and therefore, the related art technique facilitates reduced power consumption. The related art is disclosed in, for example, Japanese Laid-open Patent Publication No. 2016-177651.

SUMMARY

According to an aspect of the embodiments, a migration control apparatus includes one or more processors configured to successively select, as a first group, a virtual machine in an ascending order of power consumption from among a first plurality of virtual machines, until total power consumption of one or more non-selected virtual machines in the first plurality of virtual machines falls below a threshold, successively select, as a second group, another virtual machine in a descending order of power consumption from among the first plurality of virtual machines, until total power consumption of one or more other non-selected virtual machines in the first plurality of virtual machines falls below the threshold, select a specific group in accordance with a first number of virtual machines included in the first group and a second number of virtual machines included in the second group, and perform migration for at least one virtual machine included in the specific group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B illustrate an example of VMs selected in order from a VM having the lowest power consumption;

FIGS. 2A and 2B illustrate an example of VMs selected in order from a VN having higher power consumption;

FIG. 4 illustrates an example of a power consumption recorder;

FIG. 5 illustrates an example of a configuration information recorder;

FIG. 7C illustrates data transfer rates between virtual adapters and hosts;

DESCRIPTION OF EMBODIMENTS

Figure 11A:
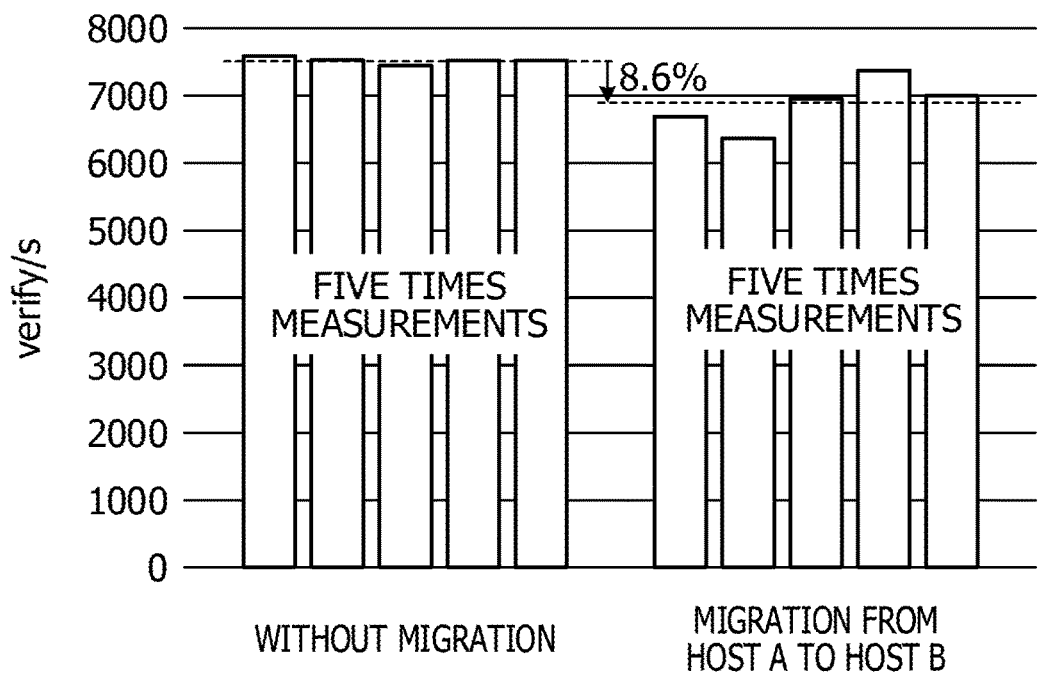
FIGS. 11A and 11B are graphs for explaining the effect on performance at the timing of performing migration under a high load condition.
Figure 11B:
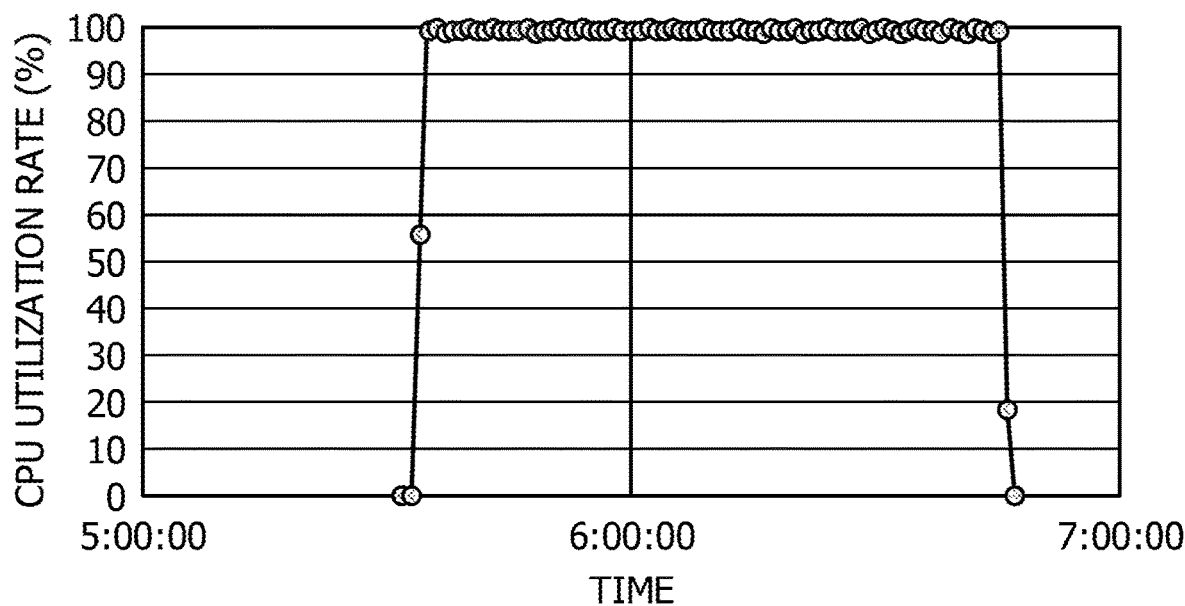

There is a problem in which performance degradation occurs when migration of a VM running on a physical server under a high-load condition is performed. Here, the high-load condition is a condition in which, for example, the load is equal to or more than a specific threshold. FIGS. 11A and 11B are graphs for explaining the effect on performance when migration under a high-load condition is performed. FIG. 11A illustrates the degradation of performance while OpenSSL is running, and FIG. 11B illustrates the central processing unit (CPU) utilization while OpenSSL is running. OpenSSL is a library used for encrypting communication, verify/s is an index for indicating performance of OpenSSL, and a host is a physical server.

As illustrated in FIG. 11B, while OpenSSL is running, the CPU utilization rate is 100%; in other words, while OpenSSL is running, the physical server is under a high-load condition. As illustrated in FIG. 11A, compared with a case without migration, in a case where a VM on which OpenSSL is running is migrated from a host A to a host B, an average performance degradation of 8.6% occurred five times.

An embodiment relating to a migration control program, a migration control method, and a migration control apparatus disclosed in the present application is described in detail below with reference to the drawings. It is noted that this embodiment is not intended to limit the disclosed technology.

Embodiment

First, a migration control method of a management server according to an embodiment is described. The management server according to the embodiment monitors power consumption of multiple hosts in a rack, and when the power consumption in the rack exceeds an upper threshold, identifies a VM to be migrated, and migrates the identified VM to a predetermined host outside the rack. The management server is an example of the migration control apparatus.

Specifically, for example, the management server according to the embodiment records the power consumption of hosts in a rack and their respective VMs. The management server according to the embodiment designates as a non-migration target, from among the hosts in the rack, a VM that is running on a host whose host usage rate is equal to or more than a usage threshold. Here, host usage rate=host power consumption/host rated power. The usage threshold is, for example, 0.7.

The usage threshold is obtained, by using the host maximum power and the host standby power (power consumed regardless of the usage condition of the host), as follows: usage threshold=(host maximum power−host standby power)/host maximum power. For example, when it is assumed that the host maximum power is 340 W and the host standby power is 108 W, the usage threshold=(340−108)/340=232/340=0.682 0.7. The usage threshold may be another value.

As described above, the management server according to the embodiment designates as a non-migration target a VM that is running on a host under a high-load condition. Furthermore, the management server according to the embodiment designates as a non-migration target a VM whose power consumption is higher than VMs that are running on hosts whose host usage rates are each less than the usage threshold. Moreover, the management server according to the embodiment designates as a non-migration target a VM that is excluded from migration targets because the performance degradation of the VM is not allowed due to, for example, a contract with its user.

The management server according to the embodiment successively selects, from VMs excluding non-migration targets, the VM having the lowest power consumption until the power consumption of the rack falls below a lower threshold and then designates the selected VMs as a first migration candidate group. Here, the lower threshold is smaller than the upper threshold. In addition, the management server according to the embodiment successively selects, from the VMs excluding non-migration targets, the VM having the highest power consumption until the power consumption of the rack falls below the lower threshold and then designates the selected VMs as a second migration candidate group.

Subsequently, the management server according to the embodiment compares the number of VMs in the first migration candidate group and the number of VMs in the second migration candidate group and selects the migration candidate group having fewer VMs as a migration target. The management server according to the embodiment then migrates the VMs included in the selected migration candidate group to the predetermined host outside the rack. When a predetermined host outside the rack does not exist, the management server according to the embodiment uses as a migration destination a host whose host usage rate is relatively low.

FIGS. 1A and 1B illustrate an example of selection of VMs having the lowest power consumption. FIGS. 1A and 1B illustrate, with respect to each host included in a rack denoted by "A-1", the location in the rack, the host serial number for identifying a specific host, the host power consumption, the host usage rate, and the power consumption of three respective VMs running on the specific host. The host rated power is 350 W. The upper threshold is 7000 W and the lower threshold is 6950 W. The power supply is 8000 W.

For example, in terms of the host having the host serial number 1234567890, the location in the rack is U30, the power consumption is 349 W, the host usage rate is 100%, and the power consumption of three respective VMs that are running on the host is 150 W, 20 W, and 79 W.

In FIGS. 1A and 1B, the hosts indicated by downward diagonal hatching have a host usage rate of 70% or more and are thus non-migration targets. The VMs indicated by both downward diagonal hatching and upward diagonal hatching are also non-migration targets due to, for example, a contract with a user. The VMs indicated by dots have the highest power consumption among VMs in the respective hosts and are thus non-migration targets.

Six VMs indicated by upward diagonal hatching are selected as a migration candidate group. By performing migration of the six VMs, the power consumption of the rack is changed from 7002 W to 6942 W, which is lower than the lower threshold of 6950 W. In FIGS. 1A and 1B, the six VMs are selected successively as migration candidates starting with the VM at the lowest position in the rack among VMs having the lowest power consumption of 10 W.

FIGS. 2A and 2B illustrate an example of selection of VMs having the highest power consumption. Two VMs indicated by upward diagonal hatching are selected as a migration candidate group. By performing migration for the two VMs, the power consumption of the rack is changed from 7002 W to 6902 W, which is lower than the lower threshold of 6950 W. As in the above description, there are fewer VMs in the migration candidate group illustrated in FIGS. 2A and 2B than in the migration candidate group illustrated in FIGS. 1A and 1B. As a result, the VMs in the migration candidate group illustrated in FIGS. 2A and 2B are selected as migration targets.

As described above, the management server according to the embodiment designates as a non-migration target a VM that is running on a host having a host usage rate equal to or more than the usage threshold and also designates as a non-migration target a VM whose power consumption is the highest among VMs that are running on a host having a host usage rate less than the usage threshold. Accordingly, the management server according to the embodiment designates as non-migration targets VMs that may degrade the performance due to migration, and as a result, it is possible to suppress the degradation of performance when migration of a VM is performed to reduce power consumption. Furthermore, the management server according to the embodiment selects, from the first migration candidate group and the second migration candidate group, the migration candidate group having fewer VMs as a migration target, and thus it is possible to minimize the number of VMs for which migration is performed and suppress the degradation of performance due to migration.

Figure 3:
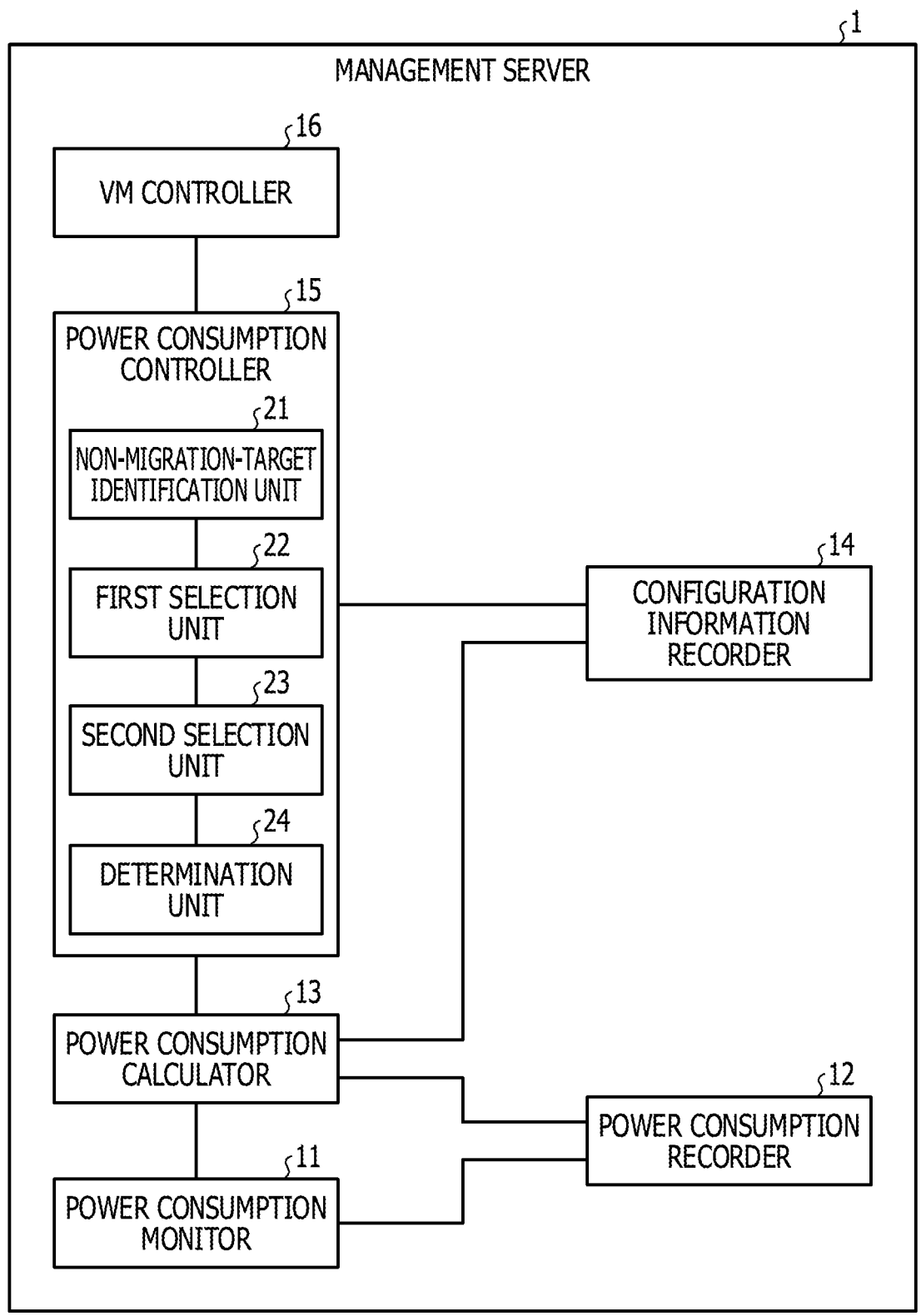
FIG. 3 illustrates a functional configuration of a management server according to an embodiment.

Next, a functional configuration of the management server according to the embodiment is described. FIG. 3 illustrates a functional configuration of the management server according to the embodiment. As illustrated in FIG. 3, a management server 1 according to the embodiment includes a power consumption monitor 11, a power consumption recorder 12, a power consumption calculator 13, a configuration information recorder 14, a power consumption controller 15, and a VM controller 16.

The power consumption monitor 11 obtains periodically, for example, every thirty seconds, information on the power consumption of hosts and VMs via a management local area network (LAN) and stores the information in the power consumption recorder 12. The power consumption recorder 12 records the power consumption of the hosts and the VMs. FIG. 4 illustrates an example of the power consumption recorder 12. As illustrated in FIG. 4, the power consumption recorder 12 records host name, rack #, location in rack, the device name, serial #, time, HCP, VMCP #1, VMCP #2, . . . , and VMCP # n (n is a positive integer) with respect to each host.

The host name is a name for identifying a specific host. The rack # is a number for identifying a specific rack. The location in rack indicates the location of a specific host in a rack. The device name is a name for identifying the type of the device of a specific host. The serial # is a number for identifying the device of a specific host. The time indicates the date and time when information on power consumption is obtained. HCP indicates the power consumption of a specific host. VMCP # i ($1 \leq i \leq n$) denotes the power consumption of VM # i running on a specific host. The unit of power consumption is watt (W).

For example, in terms of a host represented by ServerA-1-1-U42, the number of the rack is A-1-1, the location in the rack is U42, the device type is RX200S8, and the number for identifying the device is MANS010547. In addition, the date and time when information on power consumption is obtained is 9.13.2015 20:12.49 and the host power consumption is 244 W. Here, VMCP #1 is 100 W, VMCP #2 is 50 W, and VMCP # n is 30 W.

The power consumption calculator 13 calculates the power consumption for each rack in accordance with the information in the power consumption recorder 12 and stores the information on the power consumption for each rack in the configuration information recorder 14. The configuration information recorder 14 records the power consumption for each rack in addition to the information recorded in the power consumption recorder 12. FIG. 5 illustrates an example of the configuration information recorder 14. As illustrated in FIG. 5, the configuration information recorder 14 stores the information on rack power in addition to the information stored in the power consumption recorder 12. The rack power indicates the sum of power consumption of respective hosts accommodated in a specific rack. For example, the power consumption of the rack represented by A-1-1 is 5960 W.

The power consumption controller 15 determines in accordance with the configuration information recorder 14 whether the power consumption of a rack exceeds the upper threshold, and when the upper threshold is exceeded, identifies a VM as a migration target. The power consumption controller 15 includes a non-migration-target identification unit 21, a first selection unit 22, a second selection unit 23, and a determination unit 24.

The non-migration-target identification unit 21 identifies as a non-migration target a VM that is excluded from migration targets because performance degradation of the VM is not allowed due to, for example, a contract with a user. In addition, the non-migration-target identification unit 21 identifies as a non-migration target a VM that runs on a host whose power consumption is equal to or more than the usage threshold in a rack whose power consumption exceeds the upper threshold. The non-migration-target identification unit 21 also identifies as a non-migration target a VM whose power consumption is the highest among VMs that are running on a host whose power consumption is less than the usage threshold.

The first selection unit 22 successively selects as a migration target, from VMs excluding non-migration targets, the VM having the lowest power consumption until the power consumption of the rack falls below the lower threshold and designates the selected VM as a first migration candidate group.

The second selection unit 23 successively selects as a migration target, from VMs excluding non-migration targets, the VM having the highest power consumption until the power consumption of the rack falls below the lower threshold and designates the selected VM as a second migration candidate group.

The determination unit 24 compares the number of VMs in the first migration candidate group and the number of VMs in the second migration candidate group and selects one migration candidate group having fewer VMs as a migration target. Subsequently, the determination unit 24 instructs the VM controller 16 to migrate the VM in the selected migration candidate group to a predetermined host outside the rack.

When the power consumption of the rack falls below a return threshold, the determination unit 24 instructs the VM controller 16 to return the VM having been migrated outside the rack to a host having the lowest power consumption in the rack. Here, the return threshold is a value smaller than the lower threshold.

The VM controller 16 performs migration for the VM in accordance with the instruction performed by the determination unit 24. The VM controller 16 migrates the VM designated by the determination unit 24 to the predetermined host outside the rack. Otherwise, the VM controller 16 migrates the VM designated by the determination unit 24 from the predetermined host outside the rack to a host having the lowest power consumption. The predetermined host outside the rack is on hot standby for receiving the migrated VM or cold standby in which power is supplied at the timing of performing migration.

When the power consumption monitor 11 observes the power consumption of the predetermined host outside the rack and it is determined that the migration of a VM is not accepted because the power consumption of the predetermined host is relatively high, the determination unit 24 may lower the frequency of the CPU of a host on which the VM targeted for migration is running. The measurement of the host power consumption may be performed by using a power distribution unit (PDU) or simple network management protocol (SNMP) unit.

Figure 6:
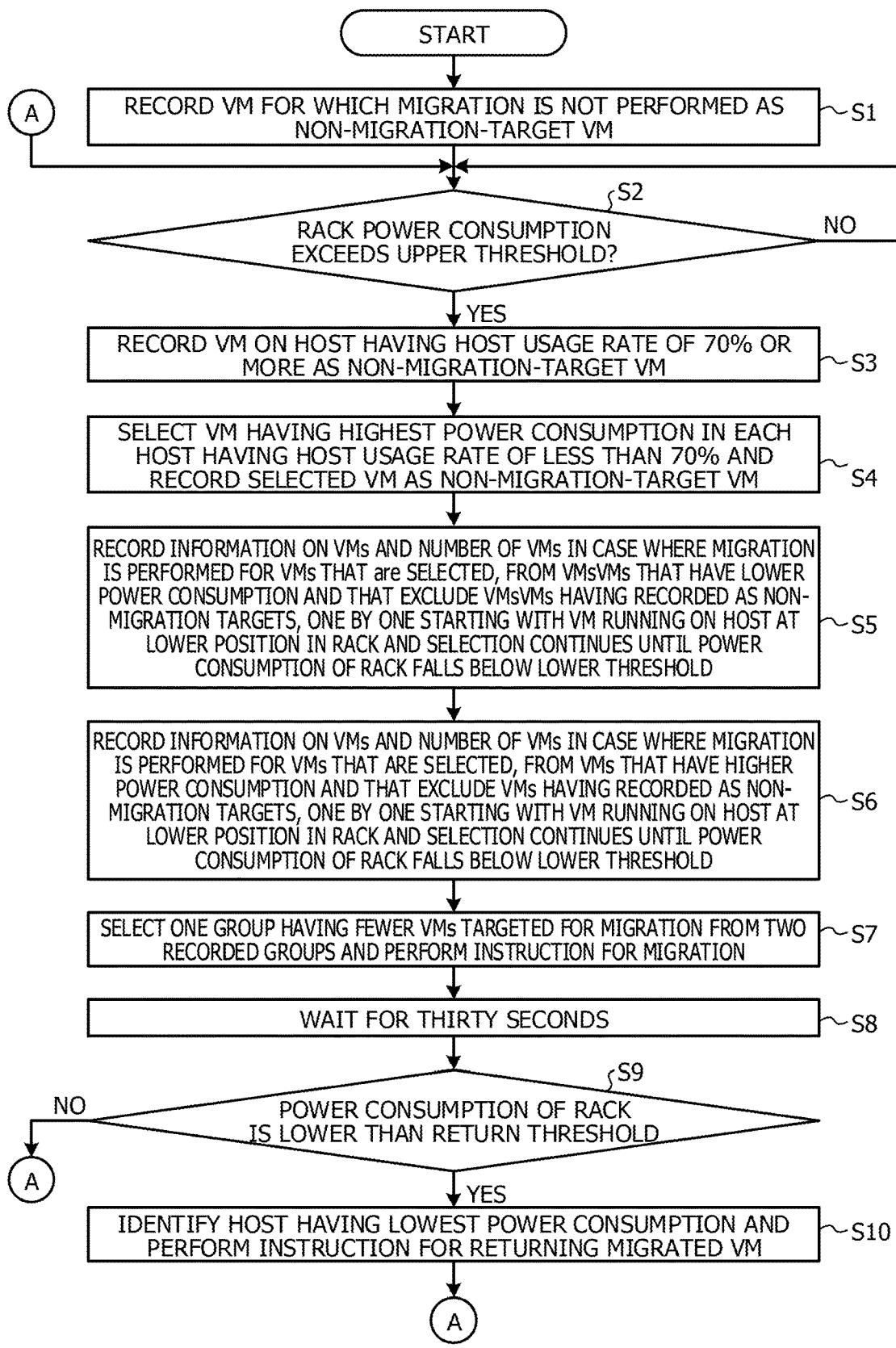
FIG. 6 is a flowchart illustrating a processing flow of a power consumption controller.

Next, a processing flow of the power consumption controller 15 is described. FIG. 6 is a flowchart illustrating a processing flow of the power consumption controller 15. As illustrated in FIG. 6, the power consumption controller 15 records, as a non-migration-target VM, a VM for which migration is not performed due to, for example, a contract with a user (step S1).

The power consumption controller 15 determines whether the power consumption of a rack exceeds the upper threshold (step S2), and when the upper threshold is not exceeded, repeats step S2 until the upper threshold is exceeded. When the power consumption of the rack exceeds the upper threshold, the power consumption controller 15 records, as a non-migration-target VM, a VM on a host having the host usage rate of 70% or more (step S3).

The power consumption controller 15 selects a VM having the highest power consumption in each host having the host usage rate of less than 70% and records the selected VM as a non-migration-target VM (step S4). When multiple VMs having the highest power consumption exist, the power consumption controller 15 selects all the multiple VMs having the highest power consumption.

Subsequently, the power consumption controller 15 records information on VMs and the number of the VMs in the case where migration is performed for the VMs that are selected, from VMs that have lower power consumption and that exclude the VMs having recorded as non-migration targets, one by one starting with the VM running on the host at the lower position in the rack and the successive selections continue until the power consumption of the rack falls below the lower threshold (step S5). Furthermore, the power consumption controller 15 records information on VMs and the number of the VMs in the case where migration is performed for the VMs that are selected, from VMs that have higher power consumption and that exclude the VMs having recorded as non-migration targets, one by one starting with the VM running on the host at the lower position in the rack and the successive selections continue until the power consumption of the rack falls below the lower threshold (step S6).

The power consumption controller 15 then selects one group having fewer VMs targeted for migration from the two recorded groups and performs an instruction for migration (step S7). The power consumption controller 15 waits for thirty seconds (step S8), determines whether the power consumption of the rack is lower than the return threshold (step S9). In a case where the power consumption of the rack is equal to or higher than the return threshold, the processing flow returns to step S2. Conversely, in a case where the power consumption of the rack is lower than the return threshold, the power consumption controller 15 identifies a host having the lowest power consumption and performs an instruction for returning the migrated VM (step S10), and the processing flow returns to step S2.

In such a manner, the power consumption controller 15 identifies a migration target while excluding the VMs on the host having the host usage rate of 70% or more and the VM having the highest power consumption in the host having the host usage rate of less than 70%. Therefore, the management server 1 is able to hinder the migration for a VM that may degrade the performance.

Figure 7A:
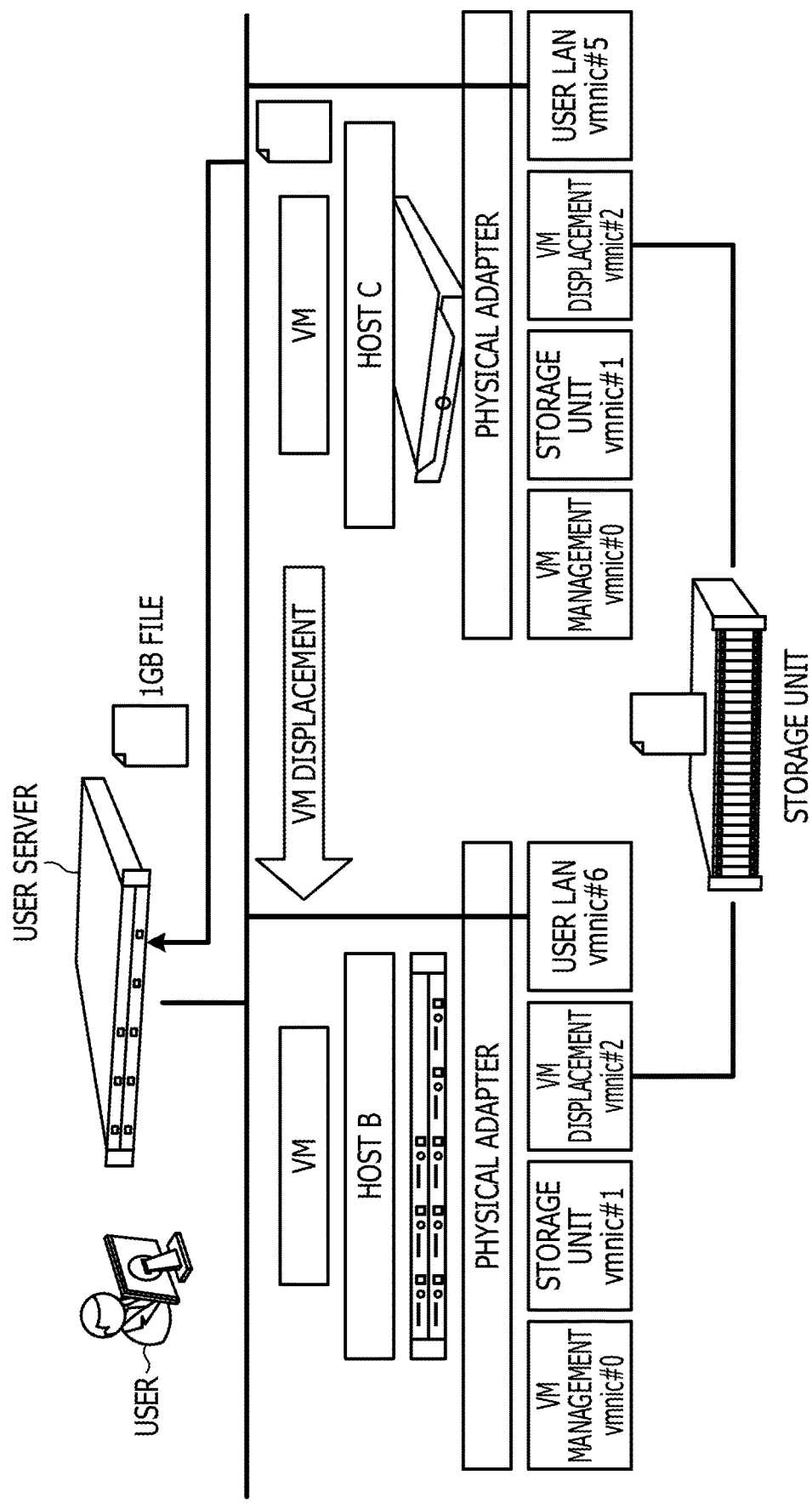
FIG. 7A illustrates an evaluation system.
Figure 7B:
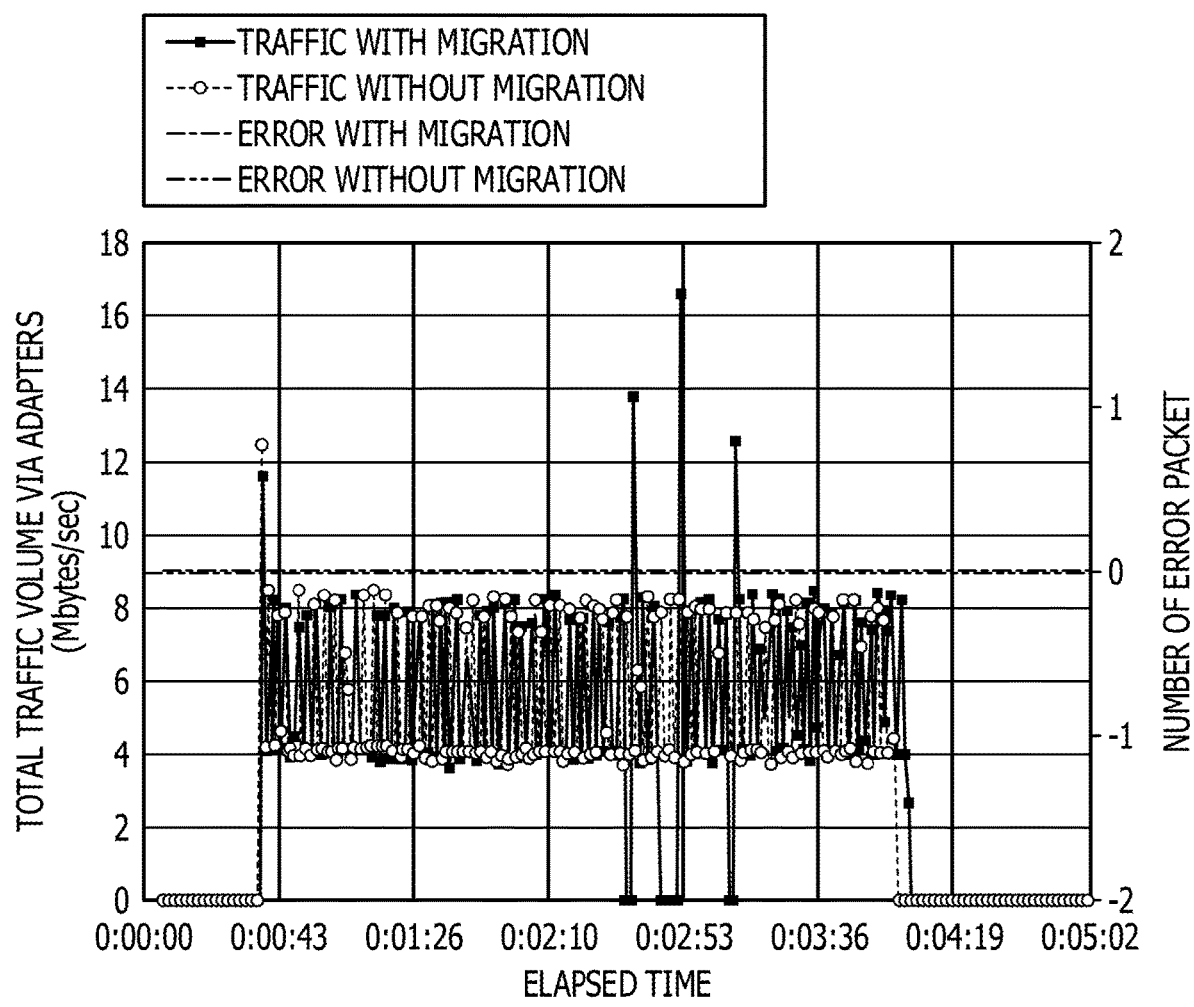
FIG. 7B illustrates total traffic volumes and the number of error packet via adapters.

FIGS. 7A to 7C are a diagram and graphs for describing an evaluation result in a case of low load conditions. FIG. 7A illustrates an evaluation system. In FIG. 7A, a 1 gigabyte (GB) file is transferred from a VM running on a host C to a user server by using the secure copy protocol (SCP) and the VM is displaced from the host C to the host B during the transfer. It is noted that the CPU load is relatively low during file transfer.

Each host is connected to four networks via a physical adapter. Virtual adapters are set to correspond to respective networks. Vmnic #0 is a virtual adapter corresponding to a network for VM management. Vmnic #1 is a virtual adapter corresponding to a network for a storage unit. Vmnic #2 is a virtual adapter corresponding to a network for VM displacement. Vmnic #5 is a virtual adapter for connecting the host C to a user LAN and vmnic #6 is a virtual adapter for connecting the host B to the user LAN.

FIG. 7B illustrates total traffic volumes and the number of error packets via the adapters. A solid line denotes the traffic in a case with migration and a dotted line denotes the traffic in a case without migration. A dot-dash line denotes errors in the case with migration and a dot-dot-dash line denotes errors in the case without migration.

As seen by comparing the solid line and the dotted line in FIG. 7B, there is little difference in the end time of file transfer (the time when the traffic returns to 0); in other words, the file transfer speed does not alter between the case with migration and the case without migration. Furthermore, as indicated by the dot-dash line and the dot-dot-dash line, the number of errors is zero. Accordingly, it is confirmed by referring to FIG. 7B that migration does not affect file transfer.

FIG. 7C illustrates data transfer rates between virtual adapters and hosts. In FIG. 7C, a dot-dash line denotes the data transfer rate between vmnic #2 and the host C and a dot-dot-dash line denotes the data transfer rate between vmnic #2 and the host B. A solid line denotes the data transfer rate between vmnic #5 and the host C and a dashed line denotes the data transfer rate between vmnic #6 and the host B.

As illustrated in FIG. 7C, in the case without migration, only the data transfer between vmnic #5 and the host C occurs. Conversely, in the case with migration, after the data transfer between vmnic #5 and the host C occurs, the data transfer between vmnic #6 and the host B occurs, and accordingly, it is confirmed that the VM is displaced from the host C to the host B. In addition, it is also confirmed that, in the case with migration, when the VM is displaced from the host C to the host B, the data transfer between vmnic #2 and the host C and the data transfer between vmnic #2 and the host B occur.

Figure 8:
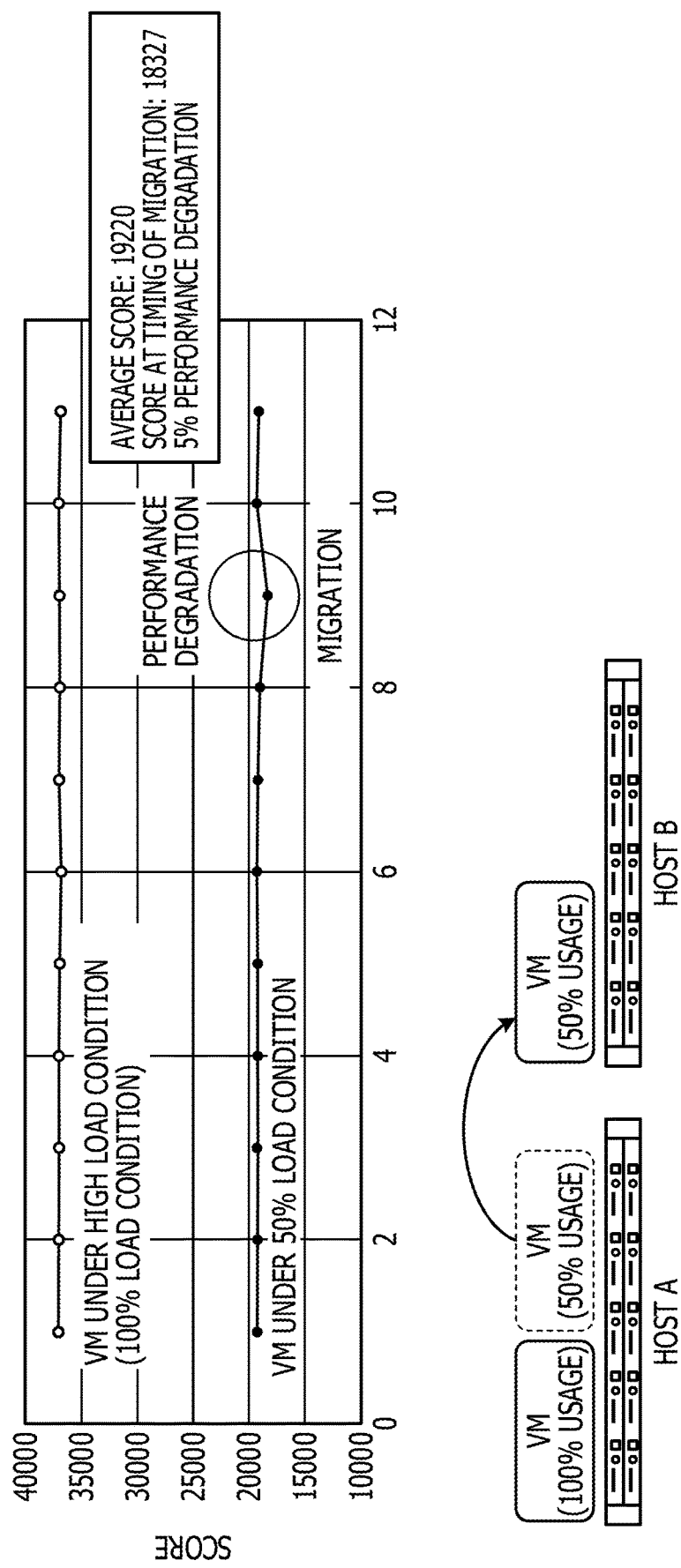
FIG. 8 illustrates an evaluation result in a case where migration is performed for a VM other than a VM having the highest power consumption.

FIG. 8 illustrates an evaluation result in a case where migration is performed for a VM other than a VM having the highest power consumption. In FIG. 8, among a VM under a 100% load condition and a VM under a 50% load condition that are both running on the host A, the VM running under the 50% load condition is migrated to the host B. A score is an evaluation index for indicating performance.

As illustrated in FIG. 8, the score of the VM under the 100% load condition is substantially consistent, and therefore, it is confirmed that the migration of the VM under the 50% load condition does not affect the VM under the 100% load condition. The average score of the VM under the 50% load condition is 19220 and the score of the VM under the 50% load condition at the timing of migration is 18327. Accordingly, the performance degradation rate of the VM under the 50% load condition due to migration is 5%, and therefore, it is confirmed that the performance degradation of the VM for which migration is performed is suppressed.

As described above, in the embodiment, the non-migration-target identification unit 21 identifies as a non-migration target a VM that is running on a host having the usage rate equal to or more than the usage threshold and also identifies as a non-migration target a VM that has the highest power consumption among VMs running on a host having the usage rate less than the usage threshold. The first selection unit 22 successively selects, from VMs in a rack excluding non-migration targets, the VM having the lowest power consumption until the power consumption of the rack falls below the lower threshold and designates the selected VM as the first migration candidate group. The second selection unit 23 successively selects, from VMs in a rack excluding non-migration targets, the VM having the highest power consumption until the power consumption of the rack falls below the lower threshold and designates the selected VM as the second migration candidate group. The determination unit 24 compares the number of VMs in the first migration candidate group and the number of VMs in the second migration candidate group, designates one migration candidate group having fewer VMs as a migration target, and instructs the VM controller 16 to perform migration for the migration candidate group. As a result, the management server 1 is able to suppress performance degradation of a VM at the timing of moving the VM for reducing the power consumption of a rack. For example, when the number of VMs in the first migration candidate group and the number of VMs in the second migration candidate group are identical to each other, the management server 1 may select the first migration candidate group as a migration target.

Furthermore, in the embodiment, the non-migration-target identification unit 21 also identifies as a non-migration target a VM for which migration is not performed because the degradation of performance is not allowed due to, for example, a contract with a user, and thus, the management server 1 is able to hinder the performance degradation of the VM in which the degradation of performance is not allowed.

Moreover, in the embodiment, when the power consumption of the rack is lower than the return threshold, the determination unit 24 returns the migrated VM to the original rack, and thus, the management server 1 is able to efficiently utilize hosts in a rack.

The functions of the management server 1, whose functional configuration has been described with reference to FIG. 3, are implemented by executing in a computer the migration control program containing multiple instructions. The hardware configuration of the computer, in which the migration control program is executed, is described below.

Figure 9:
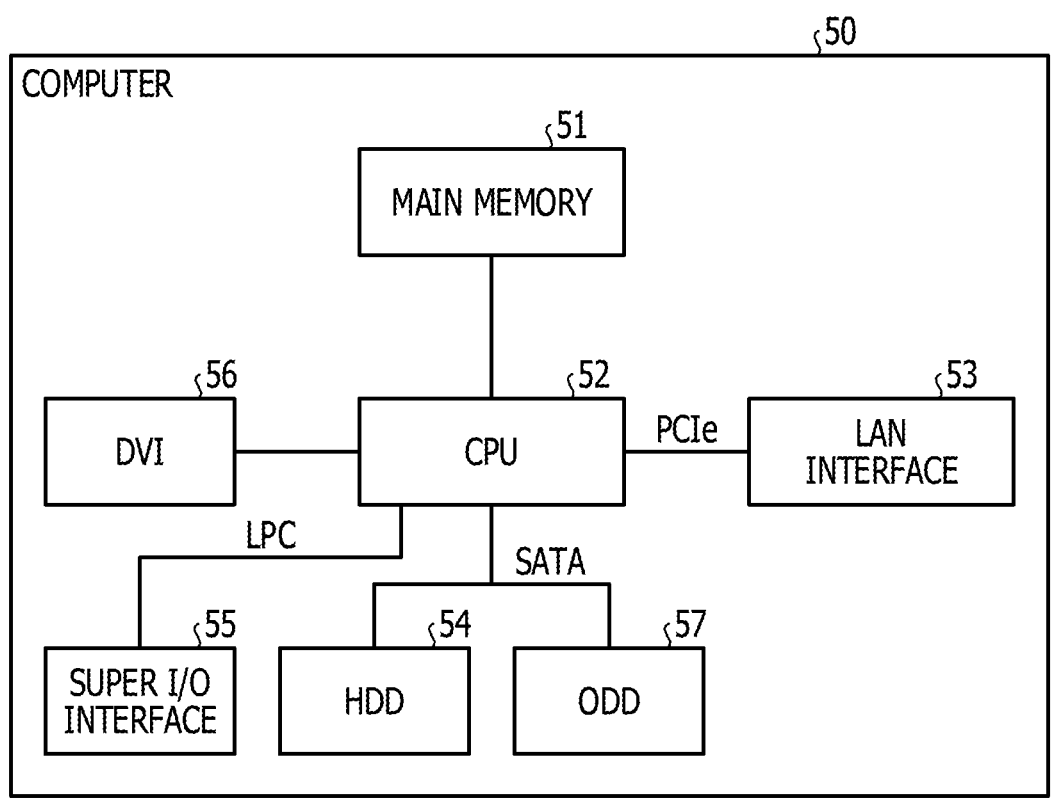
FIG. 9 illustrates a hardware configuration of a computer in which a migration control program is executed.
Figure 10:
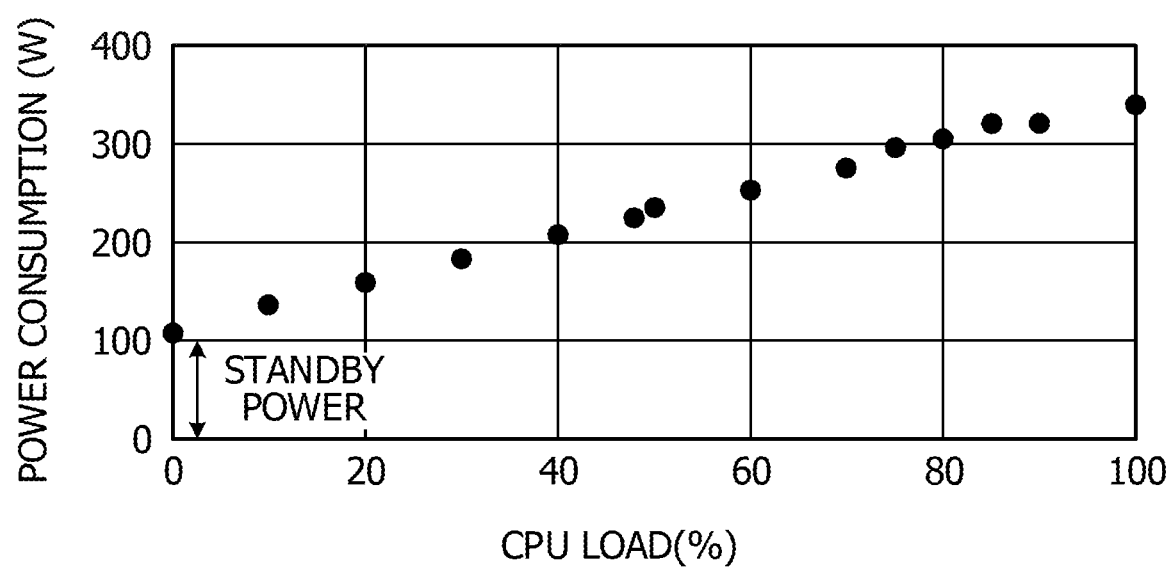
FIG. 10 illustrating a relationship between a physical server load and power consumption.

FIG. 9 illustrates a hardware configuration of the computer in which the migration control program is executed. As illustrated in FIG. 9, a computer 50 includes a main memory 51, a CPU 52, a LAN interface 53, and a hard disk drive (HDD) 54. The computer 50 also includes a super input/output (I/O) interface 55, a digital visual interface (DVI) 56, and an optical disk drive (ODD) 57.

The main memory 51 stores, for example, a program and information on an interim result during the execution of the program. The CPU 52 is a central processing unit that reads a program in the main memory 51 and executes the program. The CPU 52 includes a chipset containing a memory controller.

The LAN interface 53 is an interface for connecting the computer 50 to another computer via a LAN. The HDD 54 is a disk drive for storing a program and information. The super I/O interface 55 is an interface to which an input device, such as a mouse and a keyboard, is connected. The DVI 56 is an interface to which a liquid crystal display device is connected. The ODD 57 reads and writes data in a digital versatile disc (DVD).

The LAN interface 53 is coupled to the CPU 52 by a peripheral component interconnect express (PCIe) interface, and the HDD 54 and the ODD 57 are coupled to the CPU 52 by a serial advanced technology attachment (SATA) interface. The super I/O interface 55 is coupled to the CPU 52 by a low pin count (LPC) interface.

The migration control program executed in the computer 50 is stored in a DVD, which is an example of a storage medium readable by the computer 50, read from the DVD by the ODD 57, and installed in the computer 50. Otherwise, the migration control program is stored in, for example, a database in another computer system connected via the LAN interface 53, read from the database, and installed in the computer 50. The installed migration control program is stored in the HDD 54, loaded in the main memory 51, and executed by the CPU 52.

In the embodiment, the management server 1 performs an instruction for migration for one migration candidate group having fewer VMs among a migration candidate group composed of VMs selected starting with the VM having the lowest power consumption and another migration candidate group composed of VMs selected starting with the VM having the highest power consumption. However, the management server 1 may perform an instruction for migration for a migration candidate group composed of VMs selected starting with the VM having the lowest power consumption.

Further, in the embodiment, the management server 1 performs migration for a VM so that the power consumption of a rack does not exceed the upper threshold, but the management server 1 may perform migration for a VM so that the power consumption of a room or a container other than a rack, such as a computer room, that accommodates hosts does not exceed the upper threshold.

Moreover, in the embodiment, the management server 1 utilizes the upper threshold and the lower threshold, but the upper threshold and the lower threshold may be an identical value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A migration control apparatus comprising:
   one or more memories; and
   one or more processors coupled to the one or more memories and the one or more processors configured to
   successively select, as a first group, a virtual machine in an ascending order of power consumption of the virtual machine from among a first plurality of virtual machines deployed in a first plurality of physical servers specified by excluding any physical server having a usage rate no less than a first threshold from a second plurality of physical servers, until total power consumption of one or more non-selected virtual machines in the first plurality of virtual machines falls below a second threshold,
   successively select, as a second group, another virtual machine in a descending order of power consumption of the other virtual machine from among the first plurality of virtual machines, until total power consumption of one or more other non-selected virtual machines in the first plurality of virtual machines falls below the second threshold,
   select a specific group of the first group and the second group in accordance with a first number of virtual machines included in the first group and a second number of virtual machines included in the second group, and
   perform migration for at least one virtual machine included in the specific group.

2. The migration control apparatus according to claim 1, wherein when the first number is smaller than the second number, the specific group is the first group.

3. The migration control apparatus according to claim 1, wherein
the first plurality of virtual machines does not include each virtual machine having a highest power consumption among all virtual machines deployed in each physical server of the second plurality of physical servers.

4. The migration control apparatus according to claim 1, wherein
the first plurality of virtual machines do not include a virtual machine that is set as a virtual machine in which degradation of performance is forbidden among all virtual machines deployed in the second plurality of physical servers.

5. The migration control apparatus according to claim 1, wherein
the processor is further configured to, after the migration has been performed, return the at least one virtual machine to the first plurality of physical servers when total power consumption of virtual machines deployed in the first plurality of physical servers falls below a third threshold smaller than the second threshold.

6. The migration control apparatus according to claim 1, wherein
the first threshold is obtained by dividing a value by highest electric power of a physical server included in the first plurality of physical servers, the value being obtained by subtracting standby power of the physical server from the highest electric power.

7. A computer-implemented migration control method comprising:
successively selecting, as a first group, a virtual machine in an ascending order of power consumption of the virtual machine from among a first plurality of virtual machines deployed in a first plurality of physical servers specified by excluding any physical server having a usage rate no less than a first threshold from a second plurality of physical servers, until total power consumption of one or more non-selected virtual machines in the first plurality of virtual machines falls below a second threshold;
successively selecting, as a second group, another virtual machine in a descending order of power consumption of the other virtual machine from among the first plurality of virtual machines, until total power consumption of one or more other non-selected virtual machines in the first plurality of virtual machines falls below the second threshold;
selecting a specific group of the first group and the second group in accordance with a first number of virtual machines included in the first group and a second number of virtual machines included in the second group; and
performing migration for at least one virtual machine included in the specific group.

8. The migration control method according to claim 7, wherein
when the first number is smaller than the second number, the specific group is the first group.

9. The migration control method according to claim 7, wherein
the first plurality of virtual machines does not include each virtual machine having a highest power consumption among all virtual machines deployed in each physical server of the second plurality of physical servers.

10. The migration control method according to claim 7, wherein
the first plurality of virtual machines do not include a virtual machine that is set as a virtual machine in which degradation of performance is forbidden among all virtual machines deployed in the second plurality of physical servers.

11. The migration control method according to claim 7, further comprising: after the migration has been performed, returning the at least one virtual machine to the first plurality of physical servers when total power consumption of virtual machines deployed in the first plurality of physical servers falls below a third threshold smaller than the second threshold.

12. The migration control method according to claim 7, wherein
the first threshold is obtained by dividing a value by highest electric power of a physical server included in the first plurality of physical servers, the value being obtained by subtracting standby power of the physical server from the highest electric power.

13. A non-transitory computer-readable medium storing instructions executable by one or more computer, the instructions comprising:
one or more instructions for successively selecting, as a first group, a virtual machine in an ascending order of power consumption of the virtual machine from among a first plurality of virtual machines deployed in a first plurality of physical servers specified by excluding any physical server having a usage rate no less than a first threshold from a second plurality of physical servers, until total power consumption of one or more non-selected virtual machines in the first plurality of virtual machines falls below a second threshold;
one or more instructions for successively selecting, as a second group, another virtual machine in a descending order of power consumption of the other virtual machine from among the first plurality of virtual machines, until total power consumption of one or more other non-selected virtual machines in the first plurality of virtual machines falls below the second threshold;
one or more instructions for selecting a specific group of the first group and the second group in accordance with a first number of virtual machines included in the first group and a second number of virtual machines included in the second group; and
one or more instructions for performing migration for at least one virtual machine included in the specific group.

* * * * *